(12) United States Patent
Madawala (10) Patent No.: US 10,355,526 B2
(45) Date of Patent: Jul. 16, 2019

(54) BI-DIRECTIONAL INDUCTIVE POWER TRANSFER

(75) Inventor: Udaya Kumara Madawala, Manukau (NZ)

(73) Assignee: Auckland UniServices Limited (NZ)

( * ) Notice: Subject to any disclaimer, the term of this patent is extended or adjusted under 35 U.S.C. 154(b) by 1251 days.

(21) Appl. No.: 13/131,155

(22) PCT Filed: Nov. 26, 2009

(86) PCT No.: PCT/NZ2009/000259
§ 371 (c)(1),
(2), (4) Date: Jul. 11, 2011

(87) PCT Pub. No.: WO2010/062198
PCT Pub. Date: Jun. 3, 2010

(65) Prior Publication Data
US 2011/0254379 A1    Oct. 20, 2011

(30) Foreign Application Priority Data

Nov. 26, 2008 (NZ) .................................. 573241
Sep. 3, 2009 (NZ) .................................. 579498
Sep. 3, 2009 (NZ) .................................. 579499

(51) Int. Cl.
*H01F 38/14*    (2006.01)
*H02J 50/12*    (2016.01)
(Continued)

(52) U.S. Cl.
CPC ............. *H02J 50/12* (2016.02); *B60L 53/12* (2019.02); *B60L 55/00* (2019.02); *H02J 5/005* (2013.01);
(Continued)

(58) Field of Classification Search
CPC .... B60L 55/00; B60L 53/12; H02M 3/33584; H02J 50/12; H02J 7/025; Y02T 10/7005;
(Continued)

(56) References Cited

U.S. PATENT DOCUMENTS 5,428,521 A * 6/1995 Kigawa .................. H01F 38/14
363/22
6,501,194 B1 * 12/2002 Jiang ....................... H02J 9/062
307/104
(Continued)

OTHER PUBLICATIONS

Chwei-Sen, W. et al., "Design Considerations for a Contactless Electric Vehicle Battery Charger," IEEE Transactions on Industrial Electronics, Oct. 2005, p. 1308-1314, vol. 52, No. 5.
(Continued)

*Primary Examiner* — Daniel Kessie
(74) *Attorney, Agent, or Firm* — Calfee, Halter & Griswold LLP (57) ABSTRACT

A method, apparatus, and system are provided which enables the control of contactless power transfer in an inductive power transfer system using a phase control technique. The method comprises adjusting the phase of a secondary-side converter output voltage with respect to that of a primary-side converter. The magnitude of power transfer is determined by the relative phase angle, and the direction of power transfer is determined by whether the secondary converter output voltage leads or lags the input converter voltage, thereby enabling bi-directional power transfer between the primary and secondary sides of the system. According to alternative embodiments, the method may also be used for uni-directional power transfer only, and/or the secondary converter may be operated to maintain a constant relative phase angle.

25 Claims, 7 Drawing Sheets

(51) Int. Cl.
*H02J 5/00* (2016.01)
*H02J 7/02* (2016.01)
*H02M 3/335* (2006.01)
*B60L 53/12* (2019.01)
*B60L 55/00* (2019.01)

(52) U.S. Cl.
CPC ......... *H02J 7/025* (2013.01); *H02M 3/33584* (2013.01); *Y02E 60/721* (2013.01); *Y02T 10/7005* (2013.01); *Y02T 10/7072* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y04S 10/126* (2013.01)

(58) Field of Classification Search
CPC ....... Y02T 90/16; Y02T 90/163; Y02T 90/14; Y02T 90/128; Y02T 90/127; Y02T 90/122; Y02T 90/121; Y02T 10/7072; Y04S 10/126; Y02E 60/721
USPC ........................................................ 307/104
See application file for complete search history.

(56) References Cited

U.S. PATENT DOCUMENTS

| | | | |
|---|---|---|---|
| 6,515,878 B1 | 2/2003 | Meins | |
| 6,934,167 B2* | 8/2005 | Jang | H02J 5/005 363/21.02 |
| 7,307,390 B2* | 12/2007 | Huynh | H02M 3/33507 315/209 R |
| 7,508,173 B2 | 3/2009 | Zhou | |
| 7,515,440 B2 | 4/2009 | Park | |
| 7,579,715 B2* | 8/2009 | Seelig | H02J 5/005 244/7 A |
| 7,843,707 B2 | 11/2010 | Chen | |
| 7,880,337 B2* | 2/2011 | Farkas | B60L 11/005 307/104 |
| 8,164,925 B2 | 4/2012 | Abe | |
| 8,164,929 B2 | 4/2012 | Zimpfer | |
| 8,923,015 B2 | 12/2014 | Madawala et al. | |
| 2007/0109708 A1* | 5/2007 | Hussman | H02J 1/00 361/113 |
| 2007/0252441 A1* | 11/2007 | Yamauchi | H02J 5/005 307/104 |
| 2008/0238364 A1 | 10/2008 | Weber et al. | |
| 2010/0213770 A1 | 8/2010 | Kikuchi | |
| 2011/0231029 A1* | 9/2011 | Ichikawa | B60L 11/123 700/298 |
| 2011/0254379 A1 | 10/2011 | Madawala et al. | |
| 2011/0266878 A9 | 11/2011 | Cook | |
| 2014/0091634 A1 | 4/2014 | Mayo | |
| 2014/0139034 A1 | 5/2014 | Sankar | |
| 2015/0188320 A1 | 7/2015 | Madawala et al. | |

OTHER PUBLICATIONS

International Search Report and Written Opinion from PCT/NZ2009/000259 dated Mar. 8, 2010.
International Preliminary Report on Patentability from PCT/NZ2009/000259 dated Jun. 9, 2011.
P. Si, et al., "Wireless power supply for implantable biomedical device based on primary input voltage regulation," in Proc. 2nd IEEE Conf. Industrial Electronics and Applications, 2007, pp. 235-239.
Y. H. Chao, et al., "A primary-side control strategy for series-parallel loosely coupled inductive power transfer systems," In Proc. 2nd ICIEA, May 23-25, 2007, pp. 2322-2327.
R. Mecke, et al., "High frequency resonant inverter for contactless energy transmission over large air gap," In Proc. Rec. IEEE Power Electron, Spec. Conf., Jun. 2004, pp. 1737-1743.
P. Si, et al., "Analyses of dc inductance used in icpt power pick-ups for maximum power transfer," In Proc. IEEE/PES Transmission Distribution Conf. Exhibition 2005: Asia and Pacific, Aug. 2005, pp. 1-6.
Office Action from U.S. Appl. No. 13/131,153 dated May 24, 2013.
Office Action from U.S. Appl. No. 13/131,153 dated Feb. 27, 2014.
Amendment from U.S. Appl. No. 13/131,153 dated Jun. 26, 2014.
Supplemental Amendment from U.S. Appl. No. 13/131,153 dated Aug. 12, 2014.
Notice of Allowance from U.S. Appl. No. 13/131,153 dated Aug. 22, 2014.
Liu, et al., "Estimation of the Non-Measurable State Variables of a Transcultaneous Energy Transmission System for Artificial Human Implants Using Extended Kalman Filters," Circuits, Systems and Signal Processing, Aug. 2009, pp. 581-593, vol. 28, No. 4.
International Search Report and Written Opinion from PCT/NZ2009/000263 dated Mar. 29, 2010.
International Preliminary Report on Patentability from PCT/NZ2009/000263 dated Jun. 9, 2011.
Wang et al., "Design Considerations for a Contactless Electric Vehicle Battery Charger," IEEE Transactions on Industrial Electronics, vol. 52, No. 5, Oct. 2005, pp. 1308-1314.
Supplemental Notice of Allowance from U.S. Appl. No. 13/131,153 dated Oct. 16, 2014.
Comments on Reasons for Notice of Allowance from U.S. Appl. No. 13/131,153 dated Oct. 28, 2014.
Office Action from U.S. Appl. No. 14/584,320 dated Jan. 15, 2016.
Amendment from U.S. Appl. No. 13/131,153 dated Sep. 24, 2013.
Amendment from U.S. Appl. No. 14/584,320 dated Apr. 14, 2016.
Notice of Allowance from U.S. Appl. No. 14/584,320 dated Jun. 6, 2016.
Office Action from U.S. Appl. No. 15/281,591 dated Mar. 10, 2017.

\* cited by examiner

BI-DIRECTIONAL INDUCTIVE POWER TRANSFER

CROSS REFERENCE TO RELATED APLLICATIONS

This application is a national phase application of, claims priority to, and any other benefit of, International Application No.: PCT/NZ2009/000259, filed on Nov. 26, 2009, and entitled BI-DIRECTIONAL INDUCTIVE POWER TRANSFER, which claims priority to, and other benefit of New Zealand Application No. 579499, filed Sep. 3, 2009; New Zealand Application No. 579498, filed Sep. 3, 2009; and New Zealand Application No. 573241, filed Nov. 26, 2008, all of which are hereby incorporated by reference in their entirety.

FIELD

This invention relates to an apparatus and method for controlling power in an inductive power transfer system. More specifically, the invention enables contactless bi-directional power flow between the primary and secondary sides of single- or multiple-pickup IPT systems by controlling the relative phase angles of converters on each side.

BACKGROUND

Inductive power transfer (IPT) or inductively coupled power transfer (ICPT) systems are well known and used for a number of industrial applications, and have particular advantages where traditional methods are unable to perform satisfactorily, for example clean rooms, people moving, materials handling, battery charging, or any application requiring a substantially contactless supply of power.

A typical IPT system consists of three main components; an AC power supply, a primary conductive path, and one or more electrically isolated pickups coupled with a load and provided substantially adjacent the primary conductive path. Together, the power supply and primary conductive path form the primary side of an inductive power transfer system, while the pickup(s) and associated circuitry forms the secondary side.

The primary conductive path, typically in the form of an elongated conductive loop or track, is energised by the AC power supply to create a continuously varying magnetic field about the track. The or each pickup includes an inductive coil, in which a voltage is induced by the changing magnetic flux passing through the coil in accordance with Faraday's law of induction, thereby achieving contactless inductive power transfer.

Typically, the pickup will include some form of controller circuit to control the transfer of power to the load, including a switched-mode controller such as a boost converter, for example, to supply the relatively constant output voltage required by the load.

The power supply will commonly also be provided with a power controller. In single pickup systems, the power controller may be adapted to reduce the track current in the primary conductive path to reduce power and minimise losses at partial loads, and/or to increase the track current to compensate for a weak magnetic or inductive coupling when the pickup coil is not ideally aligned with the primary conductive path, for example, to ensure the required power is supplied to the load. In multiple pickup systems, the power controller will usually be adapted to maintain a constant current in the primary conductive path or track, to ensure that all pickups are adequately powered.

In some applications, it can be advantageous or desirable to enable contactless bi-directional power flow between the primary and secondary sides of the system. Bi-directional power flow has a number of potential applications in IPT systems, such as returning excess power generated or stored by a 'load' coupled with a pickup to the electricity supply grid. Presently, there is no known IPT system, or more particularly no known power controller for an IPT system, which facilitates bi-directional power flow in a single system. This is desirable for a number of reasons, including reducing costs, simplicity for diagnosis and repair, and improved efficiency due to the ability to re-generate and return power to the grid, for example.

OBJECT OF THE INVENTION

It is an object of the invention to provide a system and method for controlling power flow between the primary and secondary sides of an IPT system by controlling the relative phase angle of converters provided on each side. It is a further, alternative, objective of the invention to provide a system and method allowing contactless bi-directional power flow between the primary and secondary sides.

Alternatively, it is an object of the invention to at least provide the public with a useful choice.

Further objects of the invention will become apparent from the following description.

SUMMARY OF INVENTION

According to a first aspect the invention may broadly be said to consist in a control method for an inductive power transfer (IPT) system, the method comprising the step of controlling the relative phase angle of a pickup converter on a secondary side of the system with respect to a power supply converter on a primary side of the system to control the transfer of power between a primary conductive path and a load associated with the pickup.

Preferably the primary and secondary sides each further comprise a tuned inductor-capacitor-inductor (LCL) circuit.

Preferably the phase angle may be varied between 0° and 90°, or ±90° and is proportional to the magnitude of power transfer required to obtain a required pickup output.

Alternatively the method may comprise the steps of controlling the relative phase angle to maintain a constant ±90° angle between the pickup and power supply converters, and controlling the magnitude of power transfer by varying the secondary converter output voltage magnitude to maintain a required pickup output.

Preferably the step of varying the secondary converter output voltage magnitude comprises varying the pulse width of the secondary converter.

Preferably the method further comprises the step of controlling the voltage of the primary converter to maintain a constant current through the primary conductive path unless all loads are removed from the system.

Alternatively the method may comprise the step of controlling the voltage of the primary converter to maintain the minimum current through the primary conductive path sufficient for the pickup controller to maintain a required pickup output.

Preferably the method further comprises the step of controlling the direction of power flow by causing the pickup converter to either lag or lead the power supply converter by a required phase angle, thereby enabling bi-directional power transfer between the pickup and the primary side of the IPT system.

According to a second aspect, the invention may broadly be said to consist in a bi-directional pickup for an inductive power transfer (IPT) system, the pickup comprising:
- means for detecting the phase of a voltage in a primary conductive path with which the pickup is inductively coupled;
- a converter allowing adjustable phase; and
- a controller adapted to control the power transfer between the primary conductive path and a load associated with the pickup, by controlling at least the phase angle of the converter with respect to that of the primary conductive path voltage.

Preferably the pickup further comprises a tuned inductor-capacitor-inductor (LCL) circuit.

Preferably the means for detecting the phase of the primary conductive path voltage comprises means for detecting the phase of a voltage induced in the pickup.

Preferably the controller is adapted to vary the phase angle between 0° and ±90°, proportional to the magnitude of power transfer required to obtain a required pickup output.

Alternatively the controller may be adapted to maintain a constant ±90° phase angle between the pickup converter output and the primary conductive path voltage, and to control the magnitude of power transfer by varying the secondary converter output voltage magnitude to maintain a required pickup output.

Preferably the controller is further adapted to control the direction of power flow by causing the pickup converter to either lag or lead the primary conductive path voltage by a required phase angle, thereby enabling bi-directional power transfer between the pickup and the primary side.

According to a third aspect, the invention may broadly be said to consist in an inductive power transfer (IPT) system comprising:
- a power supply adapted to control the alternating current in a primary conductive path; and
- at least one pickup inductively coupled with the primary conductive path in use and comprising a converter electrically coupled to a load, the pickup being adapted to control the relative phase angle of the converter output with respect to that of the voltage in the primary conductive path to control the transfer of power between the primary conductive path and the load.

Preferably the power supply and the pickup each further comprise a tuned inductor-capacitor-inductor (LCL) circuit.

Preferably the IPT system comprises a single pickup wherein the power supply is adapted to supply the minimum alternating track current which is sufficient to supply the load.

Alternatively the IPT system may comprise a plurality of pickups inductively coupled with the primary conductive path, wherein the power supply is adapted to supply a substantially constant alternating current to the primary conductive path.

Preferably the power supplied by the or each pickup to the respective load is controlled by the pickup and is determined by the relative phase angle between the pickup converter output voltage and the output voltage of a primary converter of the power supply, wherein the power transferred to the load is proportional to the relative phase angle in the range of 0° to ±90°.

Alternatively the voltage supplied by the or each pickup to the respective load is controlled by the pickup and determined by the pulse width of the converter, wherein the relative phase angle between the pickup and primary converters is controlled to be substantially equal to ±90°.

Preferably the or each converter comprises a reversible inverter/rectifier, wherein the direction of power transfer is controlled by causing the pickup converter output voltage to either lag or lead a primary converter output voltage by a required phase angle, thereby enabling bi-directional power transfer between the load and the primary conductive path.

Preferably the or each pickup in the system is adapted to independently control the direction of power flow to/from the respective load, thereby allowing bi-directional power flow between the load and one or more other pickups via the primary conductive path.

Preferably the power supply also comprises a reversible inverter/rectifier, wherein power transferred from one or more pickups to the primary conductive path may be returned to a primary power source electrically coupled to the power supply, thereby allowing bi-directional power flow between one or more loads and the power source.

Further aspects of the invention, which should be considered in all its novel aspects, will become apparent from the following description.

DRAWING DESCRIPTION

A number of embodiments of the invention will now be described by way of example with reference to the drawings in which:

FIG. 8 shows example phasor diagrams for power flow from (a) the primary to the pickup, and (b) from the pickup to the primary.

DETAILED DESCRIPTION OF THE DRAWINGS

The present invention comprises a method for controlling power transfer and a power controller which may be associated with the power circuits of an inductive power transfer (IPT) system to enable power transfer. These power circuits comprise the power supply and one or more inductive pickup circuits in the IPT system. One of the unique advantages of the present invention is that it may be used to enable bi-directional power transfer, although the invention is not limited to such implementations and may alternatively be used to effect uni-directional power transfer.

According to the invention, power controllers are provided on both the primary and secondary sides of an IPT system to control the output of one or more pickups. The power controllers each control a converter which preferably comprises reversible inverter/rectifier, and in combination allow bi-directional power flow between the primary side (comprising at least a power supply and a primary conductive path) and the secondary side (the one or more pickups of the IPT system).

Bi-directional, for the purpose of this description, means that power can be transferred between the primary conductive path on the primary side of the IPT system, and one or more pickups on the secondary side of the system, in either direction. Power transferred in a 'reverse' direction from one or more pickups to the primary conductive path need not necessarily be returned to the power source electrically coupled to the IPT power supply, although that may be the case in various embodiments of the invention. Furthermore, those skilled in the art will appreciate that systems according to the present invention may be modified for uni-directional operation only, or merely operated in a uni-directional manner, using techniques described herein without departing from the scope of the invention.

Throughout the description like reference numerals will be used to refer to like features in different embodiments. Reference to terms such as "input", "output", "primary" and "secondary" will be used throughout with reference to the conventional direction of power flow (i.e. from the electricity supply network or grid, through the IPT power supply to the or each pickup via the primary conductive path), referred to herein as the forward direction, unless the context clearly requires otherwise. However, because the present invention allows for bi-directional power flow and operates on the same principles in both directions, it is to be appreciated that the concepts described below apply equally in the reverse direction (i.e. wherein one or more pickups supply power to the primary conductive path to power other pickups or to be returned to the primary power source).

The invention comprises a power controller adapted to control the output of an IPT power circuit by controlling the phase of a pick-up converter output, relative to the output of a power supply converter. The primary and secondary sides of the system preferably each comprise a tuned LCL circuit which facilitates bi-directional power flow with simple phase control as will be described below.

The controller, to avoid the need for communications between the primary and secondary sides of the system, may obtain an indication of the phase of the primary converter output from the voltage induced in the pickup coil by the alternating track current, and use that to determine an appropriate phase delay and/or inverter output waveform which may be used to control the direction and/or magnitude of power transfer to maintain a constant or required pickup output voltage, current, or power.

The term "converter" as used throughout the description is intended to include a rectifier, an inverter, or a reversible inverter/rectifier, the appropriate selection of which is dependent on the embodiment of the invention and will be apparent to a person skilled in the art.

The principle of controlling the magnitude of power transfer by varying relative phase angles is described in International Patent Application No. PCT/NZ2009/000191 assigned to Auckland UniServices Limited and entitled "Inductively Coupled AC Power Transfer", the contents of which are incorporated herein by reference.

Embodiments of the invention will be described herein below by way of example with respect to regulating a pickup output voltage. However it is to be appreciated that the same control technique can be implemented to regulate or otherwise control the pickup output voltage, current, or power. For example, in some applications such as battery or capacitor charging, the controller may be adapted to maintain a constant output current or power.

EXAMPLE 1

According to one example embodiment, the invention consists in a bi-directional single-pickup IPT system having a power controller on both the primary and secondary (pickup) sides of the system.

Figure 1:
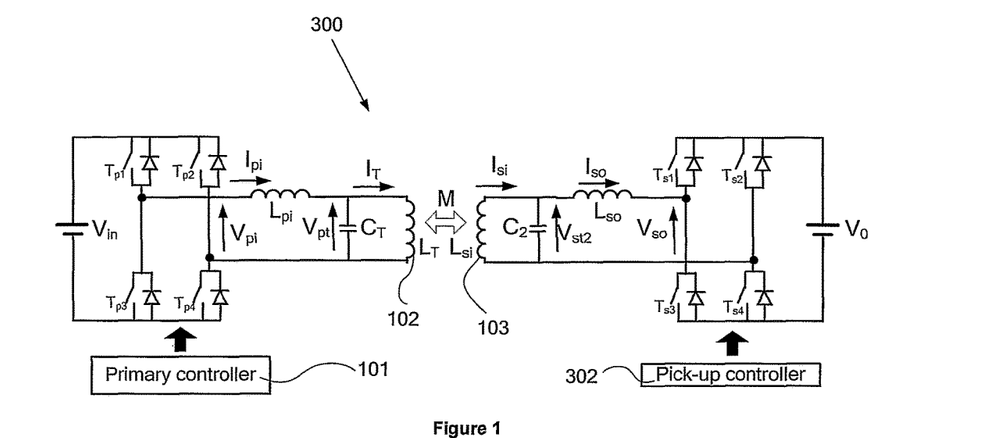
FIG. 1 is a schematic of a bi-directional single pickup IPT system according to a one embodiment of the invention.

Referring to FIG. 1, a bi-directional single pickup inductive power transfer system is shown by way of example, generally referenced 300. Although the power source $V_{in}$ is depicted as being a DC power source for the purpose of convenience, those skilled in the art will appreciate that the power supply may further comprise an AC to DC converter or rectifier such that the power supply may have a single- or multi-phase AC power source at the utility supply frequency (typically 50 or 60 Hz) in the conventional forward direction.

Together, the primary power controller 101, reversible inverter/rectifier (comprising the H-bridge of switches $T_{p1}$-$T_{p4}$ and respective parallel diodes), resonant tank, series inductor $L_{pi}$ and primary conductive path 102 may be referred to as the "primary side" of the IPT system.

The primary power controller 101 controls the operation of the primary reversible inverter/rectifier. The reversible inverter/rectifier is electrically coupled to a DC power source and a resonant tank comprising the primary conductive path or track 102 and a tuning capacitor, through the series inductor $L_{pi}$. In the conventional mode or forward direction of power transfer, the reversible inverter/rectifier operates as an inverter, receiving DC power and supplying an AC square wave voltage to the series inductor $L_{pi}$. However, as loads associated with the pickup in the IPT system 300 may include means for generating or storing electrical energy, the system 300 may also be operated in a "reverse" direction wherein the pickup supplies power to the primary conductive path, and the "power supply" may be configured to supply a DC current to the "input", $V_{in}$, to return power to the power source, as in this example. This DC current may be converted to an AC current and returned to the grid, or other circuits connected to a DC bus, for example.

Operation of the system 300 in this reverse mode is the reverse of what happens in the forward mode, which will be described in further detail below.

At the medium frequencies which are common employed in IPT systems and typically around 20-40 kHz, the output of the inverter may be a symmetric square wave voltage of adjustable phase to avoid high switching losses. This requires only a simple circuit to achieve, as shown in FIG. 1. In other embodiments, however, the inverter may be configured to provide a sinusoidal output, variable duty cycle (including pulse-width modulated output), or variable magnitude output, provided only that the phase of the output can be adjusted and the frequency is preferably substantially the same as that to which the resonant tank of both the power supply and pickup are tuned (i.e. the resonant frequency of the power supply and pickup circuits).

If required, the primary side inverter/rectifier can alternatively be configured to adjust its input voltage using a pre-regulator.

In the example IPT system 300 as illustrated, the reversible inverter/rectifier comprises four switches $T_{p1}$-$T_{p4}$ in a bridge configuration, shunted by diodes. The switches $T_{p1}$-$T_{p4}$ are preferably manipulated to produce a square-wave output voltage at a substantially fixed frequency. The duty cycle of the square wave output voltage supplied to the series inductor $L_{pi}$ in the forward direction is varied to obtain a variable converter output voltage magnitude to control the alternating track current through the primary conductive path, as described below. The timing of operation of the switches $T_{p1}$-$T_{p4}$ is thus controlled by the primary controller 101 to achieve a controlled AC output in the forward direction, or a DC output in the 'reverse' direction.

The power required by a load associated with the pickup generally fluctuates or varies with respect to time. In order to minimise losses in the primary conductive path or track 102, it is therefore desirable to decrease the current through the track 102 to the minimum level which is sufficient to supply the load with the required power. The power controller 101 of the present invention provides a means for doing this, controlling the track current to match the required output power by altering the pickup V-I (voltage-current) characteristic. Varying the track current in this way is primarily intended for single pickup IPT systems as in this example, although it may be applied in multiple pickup systems without departing from the scope of the present invention.

A typical pickup that has a winding inductance $L_2$, which if not compensated (not tuned or does not contain a resonant circuit), can be represented by the following two equations:

$$V_{OC} = jM\omega I_1$$

$$I_{SC} = \frac{M}{L_2} I_1$$

$V_{oc}$ and $I_{sc}$ are the open circuit voltage and short-circuit current, respectively, of a pickup which is magnetically coupled through a mutual inductance of M to a primary track 102 that carries a current of $I_1$ at frequency ω. As apparent from these two equations, the V-I characteristic of the pickup changes with the primary current $I_1$, if other parameters are kept constant. In other words, both the open circuit voltage and short circuit current in the pickup are directly proportional to the current $I_1$ in the primary conductive path.

If the power requirement of the load exceeds the instantaneous power available in the system, the output voltage $V_o$ will drop below the required level. The pickup output voltage $V_o$ on the secondary side of the system may be communicated to the controller 101 by a wired or wireless communication means using any standard or proprietary communication medium and/or protocol. For example, the primary and secondary sides of the IPT system may be provided with radio frequency receivers and transmitters respectively for wireless data communication, or the primary conductive path 102 may be used as a communications medium as described in International Publication No. WO/2005/043775 entitled "Communication apparatus and method" and assigned to Auckland UniServices Limited.

Alternatively, according to a preferred embodiment of the invention an estimate of the pickup output voltage $V_o$ may be derived from the voltage across the primary conductive path, thereby avoiding the need for communications between the secondary and primary sides of the system. Changes in the load supplied by the pickup are reflected through the mutual inductive coupling back to the power supply, which affects the magnitude of the voltage across the primary tank, $V_{pt}$. An estimate of $V_o$ can be derived by determining the phase, angle between the voltage and current in the primary conductive path, and using the phase angle to calculate the real component of the voltage across the primary conductive path, which is proportional to the output voltage $V_o$ for a given magnetic coupling M, as shown in the equation below.

$$V_{pt} = \frac{M}{L_{pickup}} V_{AC,O} + j\omega L_{track} I_1$$

where $V_{AC,O}$ is the AC voltage equivalent to $V_o$, $L_{pickup}$ is the inductance of the pickup coil, and $L_{track}$ is the inductance of the primary conductive path or track.

Further alternative means for providing closed-loop feedback will be apparent to those skilled in the art and may be implemented without departing from the scope of the invention.

While it may in some circumstances be preferable to have some form of feedback from the output of the secondary side of the circuit to provide improved control, in particular in applications where the mutual inductance between the primary and secondary sides of the circuit may vary in use due to variations in the distance and/or alignment of the pickup coil with respect to the primary conductive path, the above solution has been found to provide good control without the requirement for communication between the secondary and primary sides of the IPT system 300.

The magnitude of the current through the series inductor $L_{pi}$, and therefore the current supplied to the primary conductive path 102, depends on the voltage applied across the inductor for any given frequency. The frequency of the output from the inverter, $V_{pi}$, is preferably the same as that of the resonant tank voltage $V_{pt}$, to which the IPT system 300 is tuned. The track current is controlled by changing the primary inverter output voltage magnitude or amplitude, for example by varying the pulse width of the positive and negative periods of the square wave with respect to a zero-level output.

In this example embodiment, magnitude control is achieved by varying a phase delay between switch driving signals supplied to each of the two respective legs of the H-bridge inverter, from an angle of π (corresponding with the maximum voltage amplitude) to 2π (corresponding with the minimum voltage amplitude, or zero volts). The output of the primary converter in this embodiment therefore resembles the output of a three-level inverter having output levels of approximately +$V_{in}$, 0V, and -$V_{in}$. However, alternative converters may be used without departing from the scope of the invention.

The primary converter output voltage phase is thus preferably kept constant, but the voltage magnitude is controlled by controlling the H-bridge switches in a uni-polar scheme and overlapping the waveforms to control the magnitude of the track current.

The duty cycle of the switches in the primary inverter/rectifier are thus controlled to maintain an approximately constant quality factor Q (effectively the ratio between the voltage across $C_2$ and voltage induced in the pickup coil).

Figure 2:
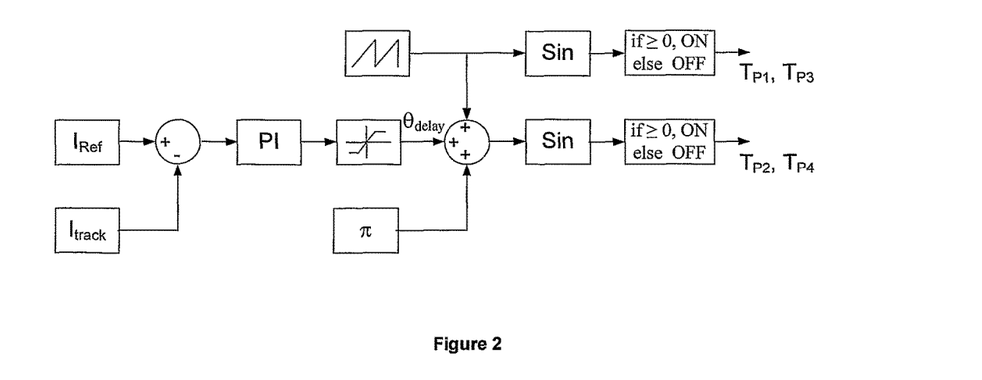
FIG. 2 is a block diagram of a possible primary-side power controller for use with the IPT system of FIG. 1.

Referring now to FIG. 2, a block diagram illustrating one possible control technique for the power controller 101 is shown. The controller compares the track current with a reference current (representing the required track current, which may be variable or constant) and uses a proportional-integral (PI) control algorithm to determine a delay $\theta_{delay}$ between the driving signals to each leg of the H-bridge inverter to obtain an appropriate converter output voltage magnitude and thus control the track current.

It will be appreciated by those skilled in the art that the block diagram of FIG. 2 illustrates only one possible example of a primary controller 101 according to the present invention, and many variations and/or modifications are possible without departing from the scope of the invention.

The pickup circuit or secondary side of the bi-directional system 300 comprises a secondary power controller 302, a secondary resonant tank circuit comprising a capacitor and a pickup coil 103, and a series inductor $L_{so}$ provided between the secondary resonant tank circuit and a reversible rectifier/inverter. It will be seen from the schematic of FIG. 1 that the electronic hardware of the primary and secondary sides of the system 300 is essentially identical according to this embodiment, as the primary and secondary controllers, 101 and 302 respectively, will typically be implemented using a physically identical microcontroller or similar electronic hardware.

Figure 3:
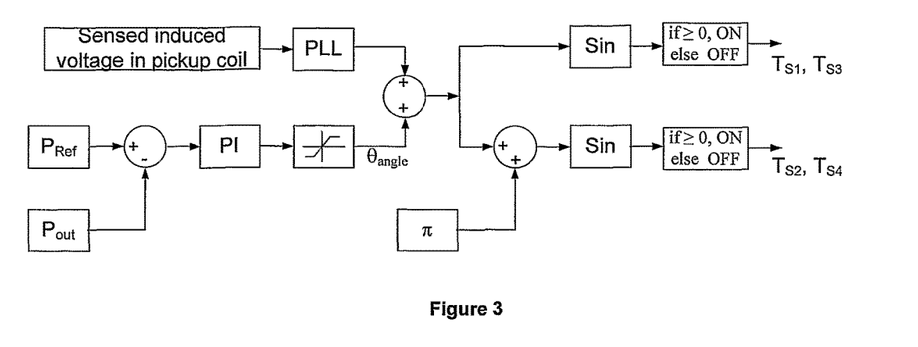
FIG. 3 is a block diagram of a possible secondary-side or pickup power controller for use with the IPT system of FIG. 1.

Referring to FIGS. 1 and 3, the phase of the voltage induced in the pickup coil, which is indicative of the phase of the primary converter output voltage, is measured using phase detection means such as the phase locked loop (PLL) as illustrated, and is used to derive the secondary drive signals controlling the secondary inverter/rectifier. Those skilled in the art will appreciate that the phase of the voltage in the primary conductive path (i.e. the phase of the primary converter output voltage) may be detected in many different ways, detection of the phase of the voltage induced in the pickup being but one example. This phase is combined with the error from a PI controller (derived from the comparison of the pickup output Power and a reference power, or output and reference voltages) to derive drive signals for the converter switches which cause the secondary converter (operating in the rectifier mode) to operate with an appropriate phase angle with respect to the primary converter in order to maintain the required output power $P_{out}$ or voltage $V_o$. Thus, the secondary inverter/rectifier is operated with a variable phase angle relative to the primary inverter/rectifier, wherein the relative phase angle is used to control the power transferred to the load as described in further detail below. The output voltage $V_o$ may therefore be said to be proportional (although not necessary directly proportional) to the relative phase delay between 0° (i.e. 0 V output) and 90° (maximum output voltage), or conversely the pickup output is proportional to the relative phase angle between the primary and secondary converters.

As the load upon the pickup circuit changes, the resonant tank voltages $V_{st}$ and $V_{pt}$ change for a given track current. The primary controller 101 varies the track current to suit load demands while minimising losses, while the secondary controller 302 varies the relative phasing of the secondary inverter/rectifier with respect to the primary inverter/rectifier to maintain the required output voltage $V_o$ as the load and track current varies. Accordingly, the primary and secondary controllers together preferably act to make the secondary voltages $V_{st}$ and $V_{so}$ substantially similar in order to minimise reactive currents in the secondary side caused by the voltage across the series inductor $L_{so}$, regardless of changes in the load.

According to an alternative embodiment, however, the primary side may be configured to supply a constant current to the primary conductive path. This results in a higher, reactive current in the secondary side as the output voltage is maintained through phase-modulation by the secondary controller, but the aforementioned output voltage feedback loop from the secondary to the primary is not required in this variation of the first example system. In either case, the same secondary-side controller may be used.

The phase angle between the primary and the secondary rectifier/inverter voltages can control both or either of the magnitude and the direction of power transfer. The direction of power flow is determined by the sign of the relative phase angle. When the secondary side converter voltage $V_{so}$ lags the primary side inverter voltage $V_{pi}$, the power flows from the primary to the load (i.e. power flows in the forward direction). Conversely, when $V_{so}$ leads $V_{pi}$, the direction of power flow is reversed. Bi-directional power flow can therefore be achieved as and when required by adjusting the relative phase angle between the primary and secondary converters to a leading or lagging angle, as appropriate. In other words, the secondary controller adjusts the relative phase angle of the secondary reversible rectifier/inverter with respect to the primary inverter voltage $V_{pi}$ to control the direction and amount of power flow as desired.

Bi-directional power flow may be required in a number of applications, such as where the load includes a battery which may be charged and/or drained, or an electric motor which may also function as a generator. One such example is in electric vehicles where excess energy may be stored in a vehicle battery, energy which may then be returned to the electricity supply grid during peak usage times if the vehicle is not in use. Thus power can be transferred inductively from the electricity network to the vehicle and vice versa, using the same controller electronics on both sides of the system.

EXAMPLE 2

According to an alternative embodiment of an IPT system which may otherwise be identical to that of the first example above, the secondary controller may be adapted to control the pickup output voltage by varying its inverter output magnitude (e.g. varying the converter output pulse widths using the H-bridge magnitude control scheme described above with respect to the primary inverter/rectifier, through pulse-width modulation of the converter output, or varying the output voltage using any other techniques known in the art), but maintain a fixed relative phase angle between the primary and secondary converters of +/−90°. The advantage of this embodiment is that the phase angle of 90° between the current and voltage results in unity power factor operation.

Figure 4:
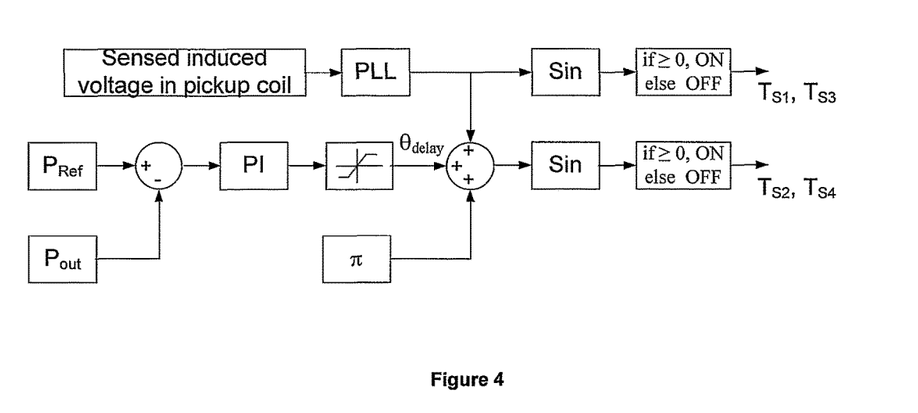
FIG. 4 is a block diagram of an alternative secondary-side power controller for maintaining unity power factor.

A block diagram of a secondary controller which maintains a relative phase angle of 90° is shown in FIG. 4. A proportional-integral control algorithm is used to determine an appropriate delay $\theta_{delay}$ between the driving signals for the H-bridge legs to affect magnitude control of the inverter output, while a phase-locked loop is used to detect the phase of the voltage induced in the pickup coil (to approximate the phase of the primary converter) and maintain a relative phase angle of 90°.

Although unity power factor operation is generally desirable, the pickup may be configured to operate with any other predetermined relative phase angle.

Optional bi-directional power flow can still be achieved by changing the relative phase angle from −90° and +90° and vice versa, as and when required.

EXAMPLE 3

In many IPT systems, there may be multiple pickups inductively coupled with a single primary conductive path and power supply at any one time. The power controller of the present invention also has application in such systems, and a schematic of a bi-directional multiple pickup inductive power system 500 is shown by way of example in FIG. 5. The IPT system 500 comprises a similar primary side as that shown in the single pickup system example of FIG. 1, but may include two or more pickup circuits in the secondary side of the system, each pickup circuit also being similar or identical to the single pickup of FIG. 1.

Figure 5:
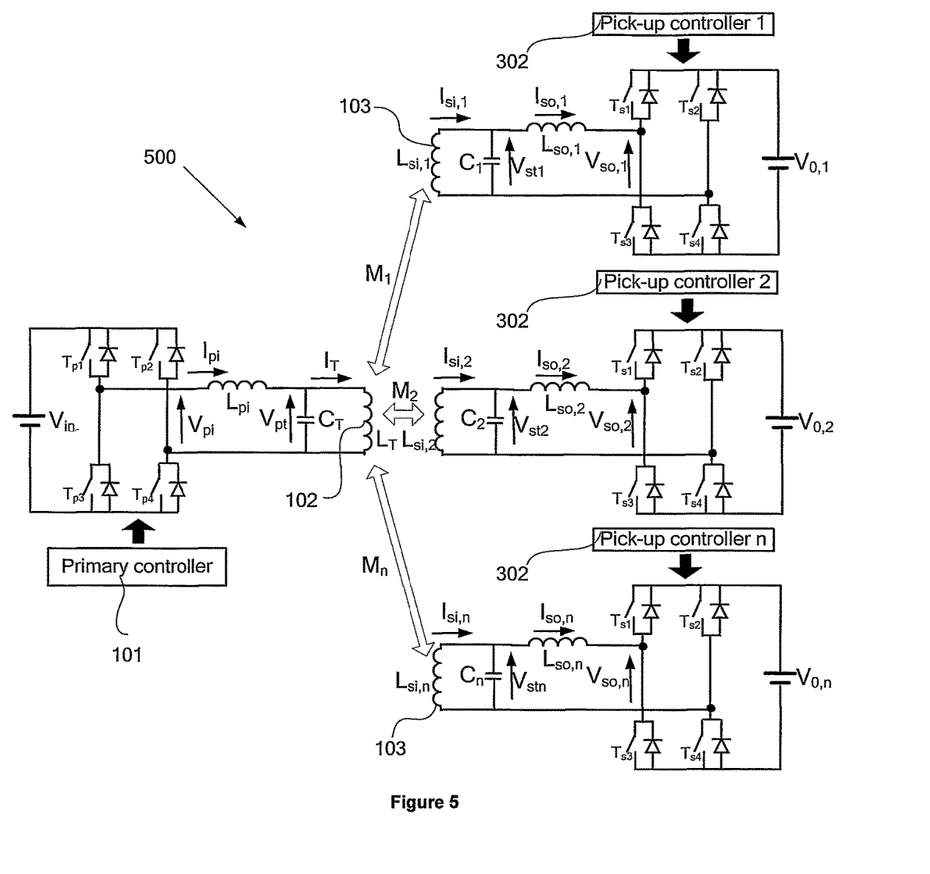
FIG. 5 is a schematic of a bi-directional multiple pickup IPT system according to a further embodiment of the invention.

In the forward mode of a multiple pickup system such as the system 500, the primary controller is preferably configured to maintain a constant current in the primary conductive path, unless all loads are removed from the system 500. The primary side controller 101 measures and maintains the track current $I_T$ by varying the voltage magnitude as necessary, either through delaying the H-bridge leg driving signals as described above, or by pulse-width-modulation (PWM) control.

The secondary side controller 302 in each pickup circuit acts to independently maintain the required output voltage $V_o$, by comparing the actual output voltage $V_o$ with a reference voltage $V_{ref}$ corresponding with the required output voltage. The error between the actual output voltage $V_o$ and the reference voltage $V_{ref}$ is fed, for example, into a proportional-integral (PI) controller to determine a phase angle between the primary and secondary inverter/rectifiers which will reduce the error between $V_o$ and $V_{ref}$. The output control signal from each controller 302 therefore controls the reversible rectifier/inverter in the pickup circuit to produce the required phase in the voltage $V_{so}$ with respect to $V_{pi}$, which can be approximated by $V_{si}$ (where $V_{si}$ is the induced voltage in the pickup/secondary due to track current).

Alternatively, the output voltage of each pickup can be controlled through voltage magnitude control or PWM control techniques to reduce reactive currents, preferably maintaining a 90° angle for unity power factor operation of the pickup as described above with respect to the second example. Regulation or control of the pickup output in that case may be achieved by modulating the pulse width of the positive and negative inverter output voltages.

Changes in the load electrically coupled to each secondary converter output typically affect the track current, however the primary controller acts to maintain a constant track current regardless of load variations, to ensure that all other pickups in the system receive adequate power. The secondary side controllers 302 each ensure that the output voltage $V_o$ of each pickup circuit is maintained as the load changes. Under no load or very light load conditions in any pickup, the relative phase angle between the primary and secondary inverter/rectifiers tends towards zero and the rectifier/inverter serves as a short circuit, decoupling the pickup from the system 500.

As in the case of the bi-directional single pickup IPT system 300, when the secondary side rectifier/inverter voltage $V_{sio}$ lags the primary inverter voltage $V_{pi}$, the power flow is from the secondary resonant tank to the load. When the phase angle is leading, the power flow is reversed. Thus the direction of power flow from each pickup to the primary conductive path may be controlled independently by the respective secondary controllers.

EXAMPLE 4

In the multiple pickup system 500, one or more pickups may be supplying power to the system 500 by inductive coupling with the primary conductive path 102 while one or more other pickups may simultaneously be supplying power to a load, receiving power from the power supply and/or other pickups via the same primary conductive path. If the total power supplied to the system 500 by the pickups exceeds the power supplied to loads by one or more other pickups, then the primary power controller may be configured to supply power to the input $V_{in}$. This will be illustrated below by way of an example application of the invention in which the method/system enables contactless bi-directional charging/discharging of multiple electric or hybrid vehicles from a common DC bus using reversible rectifiers/inverters and phase modulation. Using the invention, the electric vehicles can be used both for transportation and energy storage/supply.

In this example application, the outputs of all pickup circuits (such as those shown in FIG. 4) are connected to vehicle batteries which are represented by DC supplies to either absorb or deliver power. As in the case of typical IPT systems, a primary supply generates a constant track current in $L_T$, which is magnetically coupled to the pickup coils. The primary and pickup circuits are implemented with virtually identical electronics, which include a reversible rectifier and a tuned (resonant) inductor-capacitor-inductor (LCL) circuit, to facilitate bidirectional power flow between the track and the vehicles (pickups). Each LCL circuit is tuned to the track frequency, generated by the primary supply, and each reversible rectifier is operated either in the inverting or rectifying mode, depending on the direction of the power flow. Phase angles between the reversible rectifiers will determine the amount and/or direction of power flow.

The primary side inverter (reversible rectifier) is assumed to produce a sinusoidal voltage, $V_{pi}\angle 0$, at an angular frequency ω, where ω is the tuned frequency of the LCL circuit. The track current, $I_T$, which is the current in inductor $L_T$, is held constant by the primary side controller.

At steady state, the induced voltage $V_{si,n}$ of the '$n^{th}$' pickup due to track current $I_T$ can be given by $$V_{si,n} = j\omega M_n I_T \quad (1)$$

where $M_n$ represents the magnetic coupling between the track inductance $L_T$ and the pickup coil inductance of the $n^{th}$ pickup.

Each pickup may be operated either as a source or a sink by the corresponding reversible rectifier. Despite the mode of operation, the voltage, $V_m$, reflected onto the track due to '$n^{th}$' pickup can be expressed by $$V_m = -j\omega M_n I_{si,n} \quad (2)$$

Figure 6:
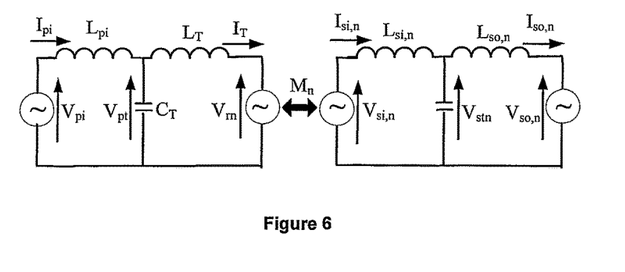
FIG. 6 is a model of a pickup of the system of FIG. 5.

The $n^{th}$ pickup system can thus be represented by the model in FIG. 6.

If the L-C-L circuits on both primary and pickup sides are tuned to the frequency of ω, and $L_{pi}=L_T$, $L_{si,1}=L_{so,1}$, ..., $L_{si,n}=L_{so,n}$ then $$\omega^2 = \frac{1}{L_T C_T} = \frac{1}{L_{si,1} C_1} = \ldots = \frac{1}{L_{si,n} C_n} = \frac{1}{L_{so,1} C_1} = \ldots = \frac{1}{L_{so,n} C_n} \quad (3)$$

Under these conditions it can be shown that the input current, $I_{in}$, and track current, $I_T$, of the primary power supply are given by $$I_{in} = j\frac{(V_{r1} + \ldots + V_m)}{\omega L_T} = j\frac{\sum_{k=1}^{n} V_{rk}}{\omega L_T} \quad (4)$$

-continued $$I_T = -j\frac{V_{pi}}{\omega L_T} \qquad (5)$$

Similarly, the input and output current of 'n$^{th}$' pickup circuit can be given by $$I_{si,n} = j\frac{V_{so,n}}{\omega L_{si,n}} \qquad (6)$$

$$I_{so,n} = -j\frac{V_{si,n}}{\omega L_{si,n}} \qquad (7)$$

Substituting (1) and (5) in (7), $$I_{so,n} = -j\frac{j\omega M_n I_T}{\omega L_{si,n}} = j\frac{M_n}{L_{si,n}}\frac{V_{pi}}{\omega L_T} \qquad (8)$$

If the equivalent AC voltage of the output or the input voltage of the reversible rectifier of the n$^{th}$ pickup system is given by $V_{so,n}\angle-\theta_n$, then the power output, $P_{on}$, of the n$^{th}$ pickup is given by, $$P_{on} = Re\{V_{so,n}(-I_{so,n})^*\} \qquad (9)$$

Substituting (10) in (11), $$P_{on} = -\frac{M_n}{L_{si,n}}\frac{V_{pi}}{\omega L_T}|V_{so,n}|\sin(\theta_n) \qquad (10)$$

Figure 7:
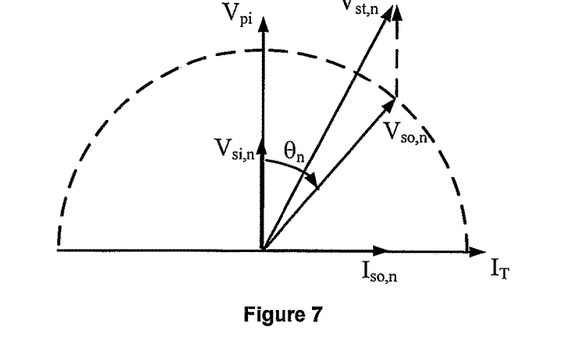
FIG. 7 is a phasor diagram of voltages and currents in the system of FIG. 5.

From (10) it is evident that maximum power transfer takes place when the phase angle is ±90 degrees. A leading phase angle constitutes power transfer from the pickup to the track while a lagging phase angle enables power transfer from the track to the pickup. Thus for any given primary and pickup voltages, both the amount and direction of power flow between the track and the pickup can be regulated by controlling the phase angle of the voltage generated by the reversible rectifier of the pickup, as described in the following section. A diagram, depicting the phasor relationship between the circuit variables of the primary and the n$^{th}$ pickup, is given in FIG. 7.

Figure 8:
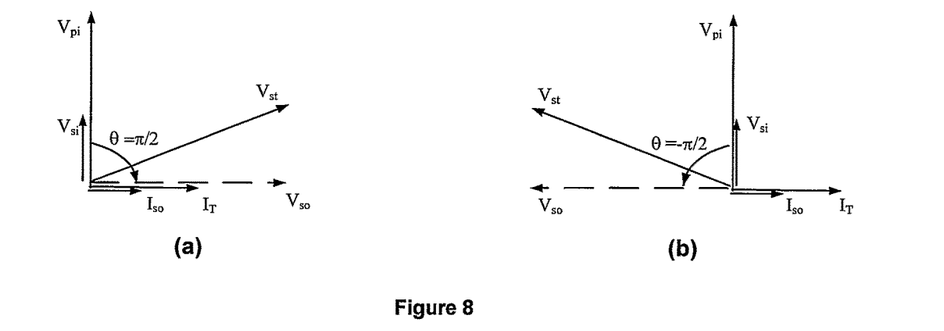
Figure 9:
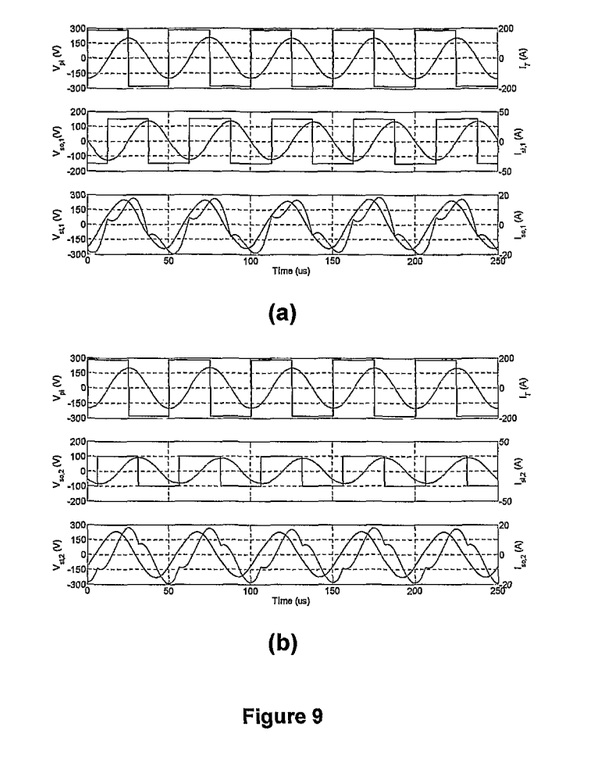
FIG. 9 is a chart of simulated waveforms in each of the pickups of the system of FIG. 5 when both pickups deliver power to their respective load.

From (10) it is evident that the power output of any pickup system can be regulated by either individual or combined control of both magnitude and phase of voltages, generated by the converters. At ±90 degrees, the pickup operates at unity power factor and the power output is maximum. A leading phase angle constitutes power transfer from the pickup to the track while a lagging phase angle enables power transfer from the track to the pickup. A diagram, depicting the phasor relationship between the circuit variables of the primary and the pickup, is shown in FIG. 8.

At unity power factor on the pickup side, the magnitude of the power flow can be controlled by varying either the primary or pickup side voltages. Changing the track current, which is generally only applicable to single pickup systems since it would otherwise affect all pickups in the system, will change the induced voltage in the pickup, and as a result at light loads with very low track currents will result in a very high Q (the ratio between the effective AC output voltage and induced voltage) for a given pickup output voltage. Such an operation with high and variable Q is unstable as the system becomes too sensitive. Alternatively, the magnitude of the voltage generated by the pickup side converter can be varied, as shown by the broken lines in FIG. 8, to control the power flow while keeping the primary voltage, hence the track current, constant. In this situation, the operation of the pickup is similar to that used in typical IPT systems, but four switches are used instead of the diode rectifier and single switch to allow for the bi-directional power flow. Therefore the average Q is kept low while the effective output current is varied, introducing a phase-shift between the switching signals of each leg of the inverter.

The primary side full-bridge converter (reversible rectifier) is driven by the primary controller, which in this example comprises a saw-tooth generator and a proportional-integral-derivative (PI) controller, to produce a phase modulated square wave or sinusoidal voltage waveform ($V_{pi}$) which regulates the track current at a desired value and frequency. The regulation is achieved by comparing the current that is flowing in the track inductor ($L_T$) with a reference value corresponding to the required track current. The error between the reference value and the actual track current is fed into a PI controller to generate the control signals for the reversible rectifier in such a manner to maintain a constant track current regardless of the load.

Although the pickup controllers are similar to the primary side controller, in this case the output power of the pickups is regulated as required to charge or discharge the batteries of electric vehicles. The error between the reference and the actual power is fed through a PI controller to generate a phase angle in such a manner that the error is reduced when the pickup side reversible rectifier is operated to produce a voltage $V_{so}$ at this phase angle with respect to the primary converter, which may be approximated by the induced voltage in the pickup.

The voltage generated by a pickup side reversible rectifier ($V_{so,n}$) is therefore modulated in such a manner that it leads or lags the induced voltage ($V_{si,n}$) by a phase angle $\theta_n$, where $-\pi/2<\theta_n<\pi/2$ Although in practice a sinusoidal $V_{so,n}$ could be generated through PWM control, a simpler bipolar square wave voltage, which reduces switching losses, is used in the simulations described below. A phase angle ($\theta_n$) between 0 and $\pi/2$ results in the pickup side converter operating as a rectifier to deliver power to the vehicle or pickup side source. When the pickup side converter is operated in the inverter mode, the phase angle varies between $-\pi/2$ and 0, and the vehicle or pickup side source supplies power to the track, which is taken by the sources of the primary side and other pickups.

A 3 kW bidirectional IPT system according to the present invention, consisting of two pickups, has been designed and simulated in The MathWorks, Inc.'s Simulink®. The design parameters of the simulated system are given in Table 1 below. The primary converter of the system was controlled to maintain a constant track current of 100 A at 20 kHz, while the converters (reversible rectifiers) of two pickups were connected to 150 V and 100 V battery sources, respectively. The two pickups were magnetically coupled to the track to either extract power from the track or deliver power back to the track through phase modulation as described above.

TABLE 1

| Parameter | Value |
|---|---|
| $V_{In}$ | 250 V |
| $V_{o,1}$ | 150 V |
| $V_{o,2}$ | 100 V |

TABLE 1-continued

| Parameter | Value |
| --- | --- |
| $L_{pl}$ and $L_r$ | 20 μH |
| $L_{sl,1}$ and $L_{so,1}$ | 50 μH |
| $L_{sl,2}$ and $L_{so,2}$ | 50 μH |
| $C_r$ | 3.16 μF |
| $C_1$ | 1.26 μF |
| $C_2$ | 1.26 μF |
| $k_1$ | 0.27 |
| $k_2$ | 0.27 |

Figure 10:
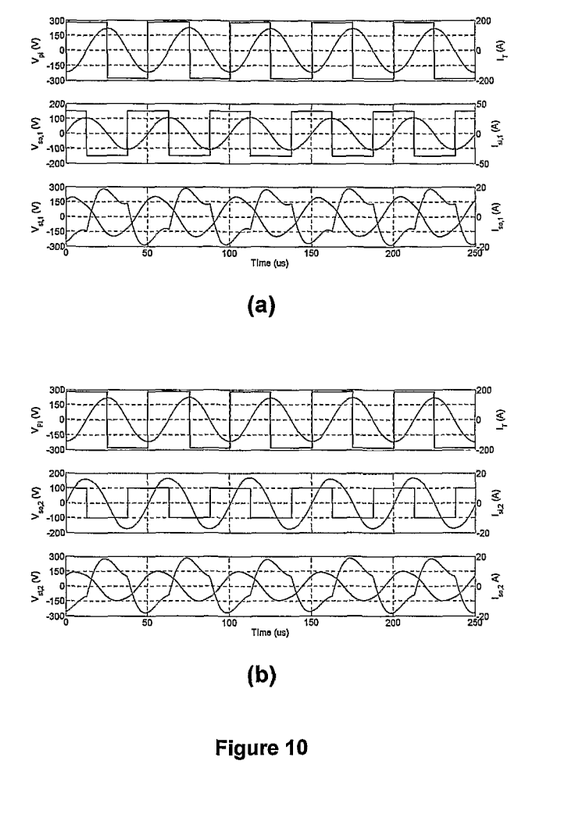
FIG. 10 is a chart of simulated waveforms in each of the pickups of a two-pickup IPT system when both pickups deliver power to the primary side.

Simulated voltage and current waveforms of the system, when "pickup 1" is configured to supply 1800 W to its load and operates with a 90 degrees lagging phase angle ($\theta_1$) and "pickup 2" to supply 700 W and operates with a 45 degrees lagging phase angle ($\theta_2$), are shown in FIGS. 10 (*a*) and (*b*), respectively. The square wave voltage waveforms in the top and middle plots of FIG. 10 (*a*) and FIG. 10 (*b*) clearly show the phase shift between the voltages generated by primary and pickup side converters. The square wave voltages generated by both pickup side converters are lagging the square wave voltage generated by the primary converter (by 90° and 45°, respectively), and therefore the power flow is from the primary side to the pickup side, as per (10). This is evident from the waveforms in the bottom plots of FIG. 10 (*a*) and FIG. 10 (*b*), which show the resonant tank voltage across the pickup tuning capacitors and the input current of the pickup side converter. At 90 degrees lagging phase angle, pickup 1 operates in the rectification mode to deliver its maximum possible specified power of 1800 W to the load. In contrast, pickup 2 also operates as a rectifier but only absorbs 700 W at 45 degrees lagging phase angle, which is less than its maximum designed power output.

FIGS. 10 (*a*) and (*b*) shows the voltage and current waveforms of the same system when both pickup side converters are operated at a leading phase angle of 90 degrees with respect to the primary converter. At 90 degree phase angle both pickup side converters generate maximum power of 1800 W and 1100 W, respectively, which is delivered to the primary side at the leading phase angle as evident from the waveforms.

Figure 11:
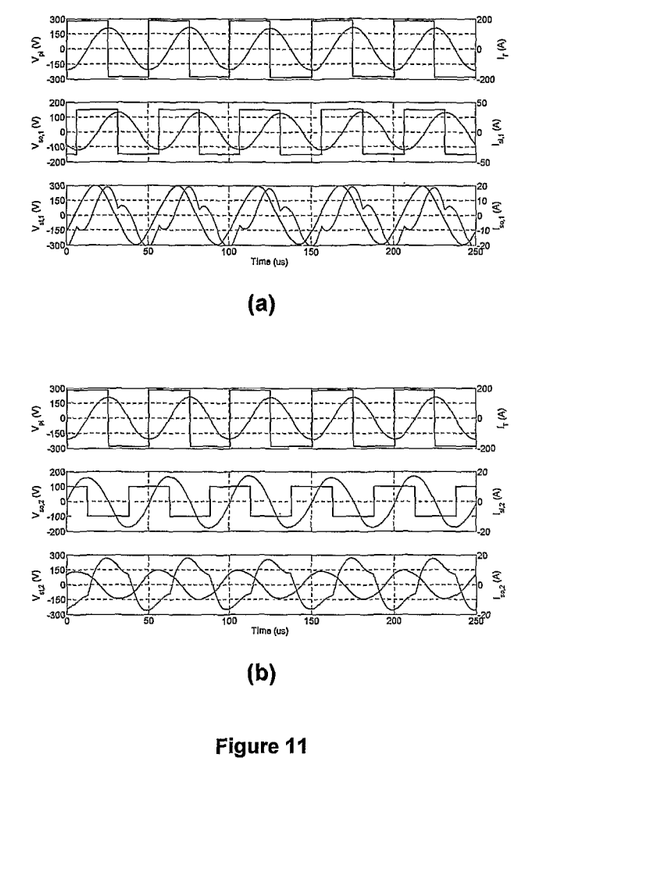
FIG. 11 is a chart of simulated waveforms in each of the pickups of the system of a two-pickup IPT system when pickup 1 delivers power to its load and pickup 2 supplies power to the primary conductive path.

Simulation results when the first pickup delivers power to its load while the second pickup supplies power to the primary side of the system are shown in FIG. 11. In this situation, pickup 1 is operated at a lagging phase angle of 45 degrees with respect to the primary side converter, and as such consumes 1100 W, which is less than its maximum rated power as expected. A portion of the power consumed by pickup 1 is supplied by pickup 2, which is operated at a leading phase angle, and the deficit of the power required by pickup 1 is provided by the primary power supply.

Thus, the present invention may be said to consist in a method for controlling contactless bi-directional power transfer, a power controller performing the aforementioned method, a power supply or pickup apparatus comprising the said power controller, and/or a bi-directional IPT system.

Those skilled in the art will appreciate that the invention allows a pickup to supply power to a primary power supply or to another pickup via the IPT track (i.e. via the primary conductive path). Thus one or more pickups can be used to augment power supplied to another pickup from the primary conductive path by a primary power supply, or one or more pickups can be used as a sole source of power to supply another pickup. Furthermore, power can be exchanged between pickups that are directly coupled to each other.

From the foregoing it will be seen that the invention enables bi-directional control of power flow between the primary and secondary sides of the system using the same or a similar controller circuit in both sides of single and multiple pickup IPT systems.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A control method for an inductive power transfer (IPT) system having a primary side comprising a primary converter and a primary resonant circuit, and a secondary side comprising a secondary converter and a secondary resonant circuit, the method comprising the steps of:
controlling a relative phase angle of the secondary converter with respect to the primary converter while maintaining the secondary resonant circuit tuning to be the same as the primary resonant circuit tuning to control a transfer of power between the primary side and the secondary side; and
controlling a magnitude of power transfer by varying a secondary converter output voltage to maintain a required pickup output, wherein varying the secondary converter output voltage magnitude comprises varying a pulse width of the secondary converter output voltage.

2. The control method of claim 1 wherein the primary and secondary resonant circuits each further comprise a tuned inductor-capacitor-inductor (LCL) circuit.

3. The control method of claim 1 wherein the relative phase angle may be varied between 0° and ±90° and is proportional to the magnitude of power transfer required to obtain the required pickup output.

4. The control method of claim 1 wherein the method further comprises the step of controlling the relative phase angle to maintain a constant ±90° angle between the secondary and primary converters.

5. The control method of claim 1, wherein the method further comprises the step of controlling a voltage of the primary converter to maintain a constant current through a primary conductive path unless all loads are removed from the system.

6. The control method of claim 1, wherein the method further comprises the step of controlling a voltage of the primary converter to maintain a the minimum current through a primary conductive path sufficient for a pickup controller to maintain the required pickup output.

7. The control method of claim 1, wherein the method further comprises the step of controlling a direction of power flow by causing the secondary converter to either lag or lead the primary converter by a required phase angle, thereby enabling bi-directional power transfer between the secondary side and the primary side of the IPT system.

8. A pickup for an inductive power transfer (IPT) system, the pickup comprising:
- a phase detector for detecting an indication of a phase of a voltage in a primary conductive path with which the pickup is inductively coupled in use;
- a resonant circuit to receive power inductively from the primary conductive path;
- a converter allowing adjustable phase; and
- a controller adapted to control a power transfer between the primary conductive path and a load associated with the pickup, by controlling at least a phase angle of the converter with respect to that of the primary conductive path voltage while maintaining the resonant circuit tuning the same as a primary resonant circuit tuning and controlling a magnitude of power transfer by varying the converter output voltage to maintain a required pickup output, wherein varying the converter output voltage magnitude comprises varying a pulse width of the converter output voltage.

9. The pickup of claim 8 wherein the resonant circuit of the pickup comprises a tuned inductor-capacitor-inductor (LCL) circuit.

10. The pickup of claim 8 wherein the phase detector is adapted to detect the phase of the primary conductive path voltage by detecting a phase of a voltage induced in the pickup.

11. The pickup of claim 8 wherein the controller is adapted to vary the phase angle between 0° and ±90°, proportional to the magnitude of power transfer required to obtain the required pickup output.

12. The pickup of claim 8 wherein the controller is adapted to maintain a constant ±90° phase angle between a converter output and the primary conductive path voltage.

13. The pickup of claim 8 wherein the controller is further adapted to control a direction of power flow by causing the converter to either lag or lead the primary conductive path voltage by a required phase angle, thereby enabling bi-directional power transfer between the pickup and the primary conductive path.

14. An inductive power transfer (IPT) system comprising:
- a power supply adapted to control the alternating current in a primary conductive path; and
- at least one pickup inductively coupled with the primary conductive path in use and comprising a converter and a resonant circuit electrically coupled to a load, the pickup being adapted to control the relative phase angle of the converter output with respect to that of a the voltage in the primary conductive path while maintaining the resonant circuit tuning at the same as a primary resonant circuit tuning to control a transfer of power between the primary conductive path and the load and control a magnitude of power transfer by varying a converter output voltage to maintain a required pickup output, wherein varying the converter output voltage magnitude comprises varying a pulse width of the converter output voltage.

15. The IPT system of claim 14 wherein the resonant circuit comprises a tuned inductor-capacitor-inductor (LCL) circuit.

16. The IPT system of claim 14 wherein the IPT system comprises a single pickup and the power supply is adapted to supply a minimum alternating track current which is sufficient to supply the load.

17. The IPT system of claim 14 wherein the IPT system comprises a plurality of pickups inductively coupled with the primary conductive path, and the power supply is adapted to supply a constant alternating current to the primary conductive path.

18. The IPT system of claim 14 wherein the power supplied by the or each pickup to its respective load is controlled by the pickup and is determined by the relative phase angle between the converter output voltage and an output voltage of a primary converter of the power supply, wherein the magnitude of power transferred to the load is proportional to the relative phase angle in a range of 0° to ±90°.

19. The IPT system of claim 14 wherein a voltage supplied by the or each pickup to the respective load is controlled by the pickup and determined by the pulse width of the converter, wherein the relative phase angle between the pickup and a primary converter is controlled to be equal to ±90°.

20. The IPT system of claim 14 wherein the or each converter comprises a reversible inverter/rectifier, and a direction of power transfer is controlled by causing the converter output voltage to either lag or lead a primary converter output voltage by a required phase angle, thereby enabling bi-directional power transfer between the load and the primary conductive path.

21. The IPT system of claim 14 wherein the or each pickup in the system is adapted to independently control a the direction of power flow to/from the respective load, thereby allowing bi-directional power flow between the load and one or more other pickups via the primary conductive path.

22. The IPT system of claim 14 wherein the power supply further comprises a reversible inverter/rectifier, and power transferred from one or more pickups to the primary conductive path may be returned to a primary power source electrically coupled to the power supply, thereby allowing bi-directional power flow between one or more loads and the power source.

23. The control method of claim 1 wherein the relative phase angle comprises a phase angle between the secondary converter output voltage and a primary converter voltage.

24. The control method of claim 1 wherein the secondary converter is at least one of a rectifier and an inverter.

25. The control method of claim 1 wherein the secondary converter is configured to convert the secondary side converter output voltage to an output voltage.

* * * * *